United States Patent
Chau (10) Patent No.: US 10,427,960 B2
(45) Date of Patent: Oct. 1, 2019

(54) METHOD FOR IMPROVING PERFORMANCE OF FLUID PROCESSING SYSTEM BASED ON CRYSTALLIZATION PROMOTING MEDIUM

(71) Applicant: Yiu Chau Chau, Hong Kong (CN)

(72) Inventor: Yiu Chau Chau, Hong Kong (CN)

( * ) Notice: Subject to any disclaimer, the term of this patent is extended or adjusted under 35 U.S.C. 154(b) by 190 days.

(21) Appl. No.: 15/312,132

(22) PCT Filed: Jun. 16, 2014

(86) PCT No.: PCT/CN2014/079913
§ 371 (c)(1),
(2) Date: Nov. 17, 2016

(87) PCT Pub. No.: WO2015/192285
PCT Pub. Date: Dec. 23, 2015

(65) Prior Publication Data
US 2017/0107125 A1    Apr. 20, 2017

(51) Int. Cl.
*C02F 1/52* (2006.01)
*F16K 15/06* (2006.01)
(Continued)

(52) U.S. Cl.
CPC ............. *C02F 1/52* (2013.01); *B01D 9/0036* (2013.01); *B01D 9/0054* (2013.01);
(Continued)

(58) Field of Classification Search
CPC ...... C02F 1/52; C02F 5/02; C02F 5/00; C02F 2001/5218; C02F 2209/03;
(Continued)

(56) References Cited

U.S. PATENT DOCUMENTS

| | | | |
|---|---|---|---|
| 8,394,267 B2 * | 3/2013 | Moniwa | B01J 20/3204 210/190 |
| 2013/0068675 A1 | 3/2013 | Chau | |
| 2013/0233407 A1 | 9/2013 | Tarczewski et al. | |

FOREIGN PATENT DOCUMENTS

| | | |
|---|---|---|
| CA | 2256858 | 7/1999 |
| CN | 1232790 | 10/1999 |
| | (Continued) | |

OTHER PUBLICATIONS

International Searching Authority, "International Search Report," issued in connection with PCT Patent Application No. PCT/CN2014/079913, dated Feb. 26, 2015, 8 pages.

*Primary Examiner* — Madeline Gonzalez
(74) *Attorney, Agent, or Firm* — Hanley Flight & Zimmerman, LLC (57) ABSTRACT

Provided is a fluid processing apparatus using a crystallization promoting medium (CPM) as a fluid processing medium. The apparatus comprises one or more column bed units in parallel connection, wherein the column bed units may be connected in parallel with a bypass flow path having a check valve, and except the first column bed unit, each of the column bed units is provided with a check valve upstream thereof. Also provided is a method for improving the efficiency of a CPM-based fluid processing apparatus having only one column bed unit. The method comprises: replacing the column bed unit of the CPM-based fluid processing apparatus having only one fluid processing column bed unit with: (i) a plurality of secondary column bed units in parallel connection, wherein the secondary column bed units may be connected in parallel with a bypass flow path having a check valve; and except the first secondary column bed unit, each of the secondary column bed units is provided with a check valve upstream thereof; or (ii) one column bed unit and a bypass flow path that is connected in (Continued)

parallel with the column bed unit and has a check valve. Also provided is a proportional check valve that opens proportionally as the pressure increases.

16 Claims, 6 Drawing Sheets

(51) Int. Cl.
    *C02F 5/00*     (2006.01)
    *F16K 15/14*     (2006.01)
    *B01D 9/00*     (2006.01)
    *C02F 5/02*     (2006.01)

(52) U.S. Cl.
    CPC .............. *B01D 9/0063* (2013.01); *C02F 5/00* (2013.01); *C02F 5/02* (2013.01); *F16K 15/06* (2013.01); *F16K 15/063* (2013.01); *F16K 15/14* (2013.01); *C02F 2001/5218* (2013.01); *C02F 2201/005* (2013.01); *C02F 2209/03* (2013.01)

(58) Field of Classification Search
    CPC .. C02F 2201/005; F16K 15/063; F16K 15/14; F16K 15/06; B01D 9/0063; B01D 9/0054; B01D 9/0036
    USPC ....... 210/741, 102, 117, 130, 134, 136, 253, 210/254, 263, 277, 284, 290, 291, 503
    See application file for complete search history.

(56) References Cited

FOREIGN PATENT DOCUMENTS

| | | |
|---|---|---|
| CN | 102190336 | 9/2011 |
| CN | 102996866 | 3/2013 |
| CN | 103403422 | 11/2013 |
| CN | 203404430 | 1/2014 |

* cited by examiner

METHOD FOR IMPROVING PERFORMANCE OF FLUID PROCESSING SYSTEM BASED ON CRYSTALLIZATION PROMOTING MEDIUM

TECHNICAL FIELD

The present invention relates to the field of fluid processing with a crystallization promoting medium being used as a fluid processing medium, and more particularly, to a method for improving the performance of a fluid processing system based on a template-assisted crystallization (TAC).

BACKGROUND

Fluid processing apparatus typically utilize one or more kinds of fluid processing media to process fluid such as water or aqueous solutions, and typically comprise one or more fluid processing units containing the fluid processing media. When fluid passes through the fluid processing media, impurities and/or contaminants therein are separated from the fluid by physical and/or chemical reaction with the processing media. A typical example of such fluid processing apparatus is the tap water purifying and softening apparatus. Such water processing apparatus provide families with purified water suitable for direct drinking and washing water, and at present are already important appliances for family use, especially for Chinese families.

For a long time, the softening apparatus has been basically the only means for processing hard water, and some other alternative means such as magnetic devices, electromagnetic devices, RF devices and catalysts have not been proved effective. The template-assisted crystallization (TAC) technology emerging in recent years is a very effective fluid processing medium, which uses special polymer particles as the fluid processing medium to allow hard water minerals (for example, $CaCO_3$) in water to precipitate and adhere onto the surface of the polymer particles in the form of harmless, inactive crystalline micro-particles, which grow to a certain size and are then released from the polymer particles to water and suspended in water in the form of non-reactive, non-adhesive grains, so as to effectively prevent formation of scale. Thus, unlike conventional fluid processing systems, TAC-based fluid processing systems do not entrap hard water minerals, but only turn hard water minerals into the form of grains.

An example of the fluid processing system using the TAC technology is the system using Next-ScaleStop as the fluid processing medium; according to the international regulations of scale prevention, the Next-ScaleStop fluid processing medium is up to 96% efficient, more efficient than any other water softener. Next-ScaleStop has the following advantages: (1) it does not require use of any chemicals, and therefore is more environmentally friendly; (2) it provides protection against scale for a whole house; (3) the medium has a long life, and is not consumed by the reaction; and (4) it retains beneficial minerals in water; (5) it brings no slimy feeling as soft water has. The Next-ScaleStop fluid processing medium is of polymer particles having a size of 0.55 to 0.85 mm (about 20×40 mesh) and a bulk density of about 0.67 kg/l.

On the surface of the polymer particles (or polymer beads) (such as Next-ScaleStop) used for the TAC-based water softening technology, there are a lot of nucleation sites of an atomic size, and at these sites dissolved hard water material is converted into tiny "crystal seeds". Once the crystal seeds are produced and grow to a certain size, the water flowing through the template-assisted crystallization (TAC) fluid processing medium contained in the column bed units will take them off the surface of the polymer particles. Thus, the mechanism of the TAC-based water softening technology is generally described as follows: (1) the dissolved hard water material is converted into tiny "crystal seeds" on the surface of polymer particles having many nucleation sites; (2) it takes several hours for the crystal seeds to grow by 10%, thus, if the flow of water is stopped throughout the night, the size of the crystal seeds released from the TAC column bed will be only slightly larger than that of normal crystal seeds; so, after the water flows for a few minutes, at various flow rates, the size of the crystal seeds released from the particle surface of a TAC column bed will again become normal (variation within only 10% or less); (3) newly produced crystal seeds adhere to the nucleation sites of an atomic size and grow, until they are flushed into the water flow, and the release rate of crystal seeds is proportional to the flow rate of water. Therefore, in order to improve the performance of TAC, a general solution is to maximize the flow rate of the water, i.e., to change from a low flow rate to a high flow rate.

Regarding the fixed column bed of a TAC-based water softening apparatus, it has the following characteristics:

1) When the flow speed is low, the kinetic energy of water molecules is low, and the "crystal seeds" flushed off the nucleation sites of an atomic size would be less. Thus, the free nucleation sites for formation of new crystal seeds will decrease, so that new crystal seeds are produced at a low rate.

2) When the flow speed is high, the kinetic energy of water molecules is high, and more "crystal seeds" would be flushed off the nucleation sites of an atomic size. Thus, the free nucleation sites for formation of new crystal seeds will increase, so that new crystal seeds are produced at a high rate.

Thus, for the TAC-based water processing system, provided that the depth of the column bed and the cross-sectional area for filtration are fixed, the lower the water flow speed is, the "crystal seeds" would be released to the water flow at a lower rate; the higher the water flow speed is, the "crystal seeds" would be released to the water flow at a higher rate. For the conventional filtration function, provided that the depth of column bed and the cross-sectional area for filtration are fixed, the lower the water flow speed is, the higher the filtration efficiency is. That is, in this regard, TAC is contrary to conventional filtration. In general, the mechanism of conventional filtration is that more adsorption leads to higher efficiency, while the mechanism of the TAC system is that less adsorption leads to higher efficiency. Current Next-ScaleStop fluid processing apparatus use only one column bed unit. When the flow rate of water is low, the flow speed of water passing through the column bed unit is low, resulting in a poor crystallization effect.

The present inventor has paid attention to this feature of the TAC technology and developed a method for improving the performance of a TAC-based water processing system.

Although the background of invention is described above, not all of the above contents are necessarily in the prior art.

SUMMARY OF THE INVENTION

In order to improve the performance of a TAC-based fluid processing system, the present application provides a fluid processing method and a corresponding fluid processing apparatus. With the fluid processing method and the fluid processing apparatus provided by the present application, the flow speed of fluid passing through the column bed of the fluid processing medium may be increased while the flow rate of the entering fluid is low, so as to achieve higher water processing efficiency and reduce accumulation of contaminants, so that not only formation of deposits (e.g., scale) is more effectively prevented, but also the chance of clogging in the column bed is reduced.

Although the present invention is completed on the basis of the existing TAC technology, for a skilled artisan, the apparatus and method of the present invention are not only applicable to the existing TAC technology, but also applicable to other fluid processing media having a similar function and mechanism as TAC, and we collectively call such media "crystallization promoting media (CPM)". As used herein, CPM refers to media having nucleation sites of an atomic size on the surface which promote formation of crystals of a specific substance; when the specific substance dissolved in fluid flows through the media with the flow of the fluid, the substance can form a crystal and grow at the nucleation sites on the surface of the media, and when the crystal grows to a certain size, it will be flushed off by the fluid to release reusable nucleation sites. The specific substance herein may be hard water minerals or any other crystallizable materials. The TAC medium is an example of CPM, in which case the specific substance is hard water minerals, and the medium itself is special polymer particles for the hard water minerals.

In the present application, the term "column bed" refers to a body of an accumulated fluid processing medium, but is not limited to a columnar shape. Herein, the term "column bed unit" refers to a unit containing a fluid processing medium, has a column bed housing, and has both ends in communication with a fluid inlet tube and a fluid outlet tube respectively. Herein "the column bed unit", "fluid processing unit", "fluid filtration column", and "fluid filter" may be used interchangeably. Similarly, the "column bed unit" is also not limited to a columnar shape. Furthermore, as used herein, the "cross-sectional area of column bed unit" refers to the cross-sectional area of the inner cavity of the housing of the column bed, that is, substantially the cross-sectional area of the column bed of the fluid processing medium filling the column bed unit.

As used herein, the term "flow rate" of fluid refers to the total amount of fluid flowing through a fluid processing apparatus per unit time, and its unit is e.g. gallon/min (gpm); the term "flow speed" of fluid flowing through a processing medium refers to the macroscopic moving speed of fluid molecules flowing through a column bed unit per unit time. For a flow path with a cross-sectional area S, flow rate=flow speed*S. Herein, the unit of the flow speed is an arbitrary unit (artificial unit), represented by x.

Herein, the "CPM-based fluid processing apparatus" refers to a fluid processing apparatus using the crystallization promoting medium (CPM) as the fluid processing medium. The "TAC-based fluid processing apparatus" refers to a fluid processing apparatus using template-assisted crystallization (TAC) fluid processing medium as the fluid processing medium.

In a first aspect, the present invention provides a fluid processing apparatus, comprising: a fluid inlet tube, N column bed units in parallel connection, and a fluid outlet tube; wherein each column bed unit contains a crystallization promoting medium (CPM) as a fluid processing medium for processing the fluid flowing therein; said N column bed units are all in fluid communication with the fluid inlet tube; N is an integer greater than 1; except the first column bed unit, each column bed unit is provided with one check valve upstream thereof in the inflow direction, and each check valve being designed to open and close under a specific fluid pressure; wherein when the total number of the check valves is two or more, at least two check valves have different opening pressure thresholds and different closing pressure thresholds from each other. Preferably, the opening pressure thresholds, as well as the closing pressure thresholds, of the plurality of check valves increase progressively over these check valves.

In the apparatus of the first aspect, the fluid inlet tube may branch into N branch tubes in parallel connection, and the N branch tubes are in fluid communication with the N column bed units, respectively. In this case, the branches may be branches in bus topology or branches in tree topology. In the case of branches in bus topology, each check valve may be installed in the middle of each branch tube, or may be installed between the branch tube and the inlet of the corresponding column bed unit; and preferably, the N branch tubes have the same inner diameter. In the case of branches in tree topology, two column bed units may share one check valve.

In the apparatus of the first aspect, the N column bed units may have the same cross-sectional area and the same column bed depth. Alternatively, at least some of the column bed units may have a cross-sectional area and column bed depth different from each other.

In the apparatus of the first aspect, the total amount of the CPM medium in the N column bed units is less than or substantially equal to the total amount of the CPM medium in a fluid processing apparatus having only one column bed unit. Optionally, the cross-sectional area of each of the N column bed units is 1/N of the cross-sectional area of the column bed unit in a fluid processing apparatus having only one column bed unit, and the depth of the CPM fluid processing medium column bed in each of the N column bed units is equal to the depth of the medium column bed in a CPM-based fluid processing apparatus having only one column bed unit.

In the apparatus of the first aspect, the $n^{th}$ check valve has an opening pressure threshold of $a+b*(n-1)$ psi, and a closing pressure threshold of $c+d*(n-1)$ psi, wherein a is the opening pressure threshold of the first check valve, b is an increment in the opening pressure threshold, c is the closing pressure threshold of the first check valve, d is an increment in the closing pressure threshold, and n is an integer greater than 0 and less than N. For example, the $n^{th}$ check valve may have an opening pressure threshold of $2.0+0.2*(n-1)$ psi, and a closing pressure threshold of $0.5+0.2*(n-1)$ psi, where n is an integer and $0<n<N$.

In the apparatus of the first aspect, the check valve may be a simple on-off check valve, or may be a proportional check valve that opens proportionally to the pressure. When a proportional check valve is used, even though the amount of the CPM fluid processing medium used is 50% or 25% of that in a conventional fluid processing system having a single column bed unit, the apparatus can still achieve comparable or higher fluid processing efficiency.

In the apparatus of the first aspect, the check valve installed in the branch tube upstream of each column bed unit may be replaced with two or more secondary check valves in parallel connection, wherein the secondary check valves in parallel connection have different opening pressure thresholds and different closing pressure thresholds from each other, so that the fluctuation in the flow speed of fluid can be reduced or prevented.

In the apparatus of the first aspect, the N column bed units, together with the N−1 check valves, may be further connected in parallel with a bypass flow path, in which a bypass check valve is installed and has an opening pressure threshold and a closing pressure threshold respectively higher than the opening pressure thresholds and the closing pressure thresholds of the other check valves.

In the apparatus of the first aspect, the crystallization promoting medium (CPM) may be a template-assisted crystallization (TAC) fluid processing medium, preferably a Next-ScaleStop fluid processing medium.

In the apparatus of the first aspect, the fluid may be water, including impure water such as tap water, industrial wastewater, and agricultural water.

In a second aspect, the present invention provides a fluid processing apparatus, comprising a fluid inlet tube, N column bed units, a bypass flow path and a fluid outlet tube, wherein N is a positive integer; the column bed units contain a crystallization promoting medium (CPM) as a fluid processing medium for processing the fluid flowing therein; the column bed units are connected in parallel with the bypass flow path, and in fluid communication with the fluid inlet tube; wherein the bypass flow path is provided with one bypass check valve designed to open and close under a specific fluid pressure. A check valve may be installed upstream of each column bed unit, but not upstream of the bypass flow path, and these check valves all have an opening pressure threshold and a closing pressure threshold respectively lower than the opening pressure threshold and the closing pressure threshold of the bypass check valve.

In the apparatus of the second aspect, the total amount of the CPM medium in each column bed unit is less than or substantially equal to 1/N of the total amount of the CPM medium in a CPM-based fluid processing apparatus having only one column bed unit, wherein N is an integer greater than 1. Optionally, the cross-sectional area of the column bed unit is 1/N of the cross-sectional area of the column bed unit in an existing CPM-based fluid processing apparatus, and the depth of the column bed of the CPM fluid processing medium in the column bed unit is equal to the depth of the medium column bed in the column bed unit of the existing CPM-based fluid processing apparatus. Preferably, N=4. When N=4, the check valve may have an opening pressure threshold of 2.0 psi, and a closing pressure threshold of 0.5 psi. But N is not limited to this.

In the apparatus of the second aspect, the check valve may be a simple on-off check valve, or may be a proportional check valve that is opened proportionally to the pressure. Alternatively, the check valve may be replaced with two or more secondary check valves in parallel connection, wherein the secondary check valves in parallel connection have different opening pressure thresholds and different closing pressure thresholds from each other.

In the apparatus of the first or second aspect, one master control valve working in an automatic mode is provided upstream of all column bed units in the fluid inflow direction; the master control valve opens and closes at predetermined frequency, and each closure of the master control valve lasts long enough for the CPM fluid processing medium to be completely deposited at the bottom of the column bed units during the stoppage of the flow. Further, in order to allow water to rapidly flow out via other paths, preferably, a discharge bypass is provided between the master control valve and all of the column bed units, and has a second control valve installed therein working in an automatic mode and configured to open when the master control valve is closed, and to close when the master control valve is opened.

In the apparatus of the second aspect, the crystallization promoting medium (CPM) may be a template-assisted crystallization (TAC) fluid processing medium, preferably a Next-ScaleStop fluid processing medium.

The apparatus of the first or second aspect may further comprise a crystal growth medium (CGM). Herein, the crystal growth medium (CGM) refers to a medium providing a surface for temporarily adsorbing "crystal seeds" of a specific substance, and has one or more of the following characteristics: 1) having an attractive charge, 2) having a rough surface with a plurality of micropores for adsorbing the "crystal seeds", 3) having a chemical attraction force, and 4) having a physical attraction force. The "crystal seeds" of a specific substance may be crystal of any substance, for example, crystal of hard water minerals. In the apparatus of the first or second aspect, the crystal seeds adsorbed by the crystal growth medium are the crystal seeds produced by the CPM. The crystal growth medium may be mixed with the CPM fluid processing medium and together contained in the column bed units, or may be separately connected downstream of the CPM fluid processing medium column bed units. An example of the crystal growth medium is granular activated carbon (GAC) or Next-Sand.

A third aspect of the present invention relates to a method for improving the efficiency of a CPM-based fluid processing system, comprising: replacing the column bed unit of a CPM-based fluid processing apparatus having only one fluid processing column bed unit with N secondary column bed unit(s), wherein the sum of cross-sectional area of the N secondary column bed unit(s) is less than or substantially equal to the cross-sectional area of the column bed unit of the CPM-based fluid processing apparatus, and the bed depth of the medium in each secondary column bed unit is substantially equal to the bed depth of the medium in the CPM-based fluid processing apparatus, and N is a positive integer; wherein, when N=1, a bypass flow path is provided in parallel connection with the secondary column bed unit, the bypass flow path is provided with a bypass check valve designed to open and close under a specific fluid pressure, and the secondary column bed unit has a cross-sectional area less than the cross-sectional area of the column bed unit of the CPM-based fluid processing apparatus; when N>1, except the first secondary column bed unit, each of the secondary column bed units is provided with one check valve upstream thereof in the inflow direction, designed to open and close under a specific fluid pressure; wherein when the total number of the check valves is two or more, at least two check valves have different opening pressure thresholds and different closing pressure thresholds from each other. It should be understood that the method of the third aspect of the present invention may be configured with various configurations and parameters in the first aspect.

A fourth aspect of the present invention relates to a method for improving the cleaning mode of a CPM-based fluid processing system, comprising: providing one master control valve working in an automatic mode upstream of all of the column bed units in the CPM-based fluid processing apparatus, wherein the master control valve opens and closes at predetermined frequency, and each closure of the master valve lasts long enough for the CPM fluid processing medium to be completely deposited at the bottom of the column bed units during the stoppage of the flow. The method of the fourth aspect of the present invention may clean the CPM fluid processing medium during a continuous fluid flow.

In the method of the fourth aspect, a bypass flow path may be further provided in parallel connection with the master control valve and all of the column bed units, and a bypass check valve is provided in the bypass flow path; when the master control valve is closed, the bypass check valve opens. In the method of the fourth aspect, in order to allow water to rapidly flow out via other paths, a discharge bypass may be provided between the master control valve and all of the column bed units, and the discharge bypass has a second control valve installed therein, working in automatic mode and configured to open when the master control valve is closed and to close when the master control valve is opened. It should be understood that the method of the fourth aspect of the present invention may be configured with various configurations and parameters in the first aspect. Further, the present invention also relates to a CPM-based fluid processing apparatus modified by the method of the fourth aspect.

A fifth aspect of the present invention further relates to a proportional check valve, comprising: a bottom cover (501), a housing (502), a top cover (503), an elastic member (504) and a piston (505); when the proportional check valve is open, fluid flows from the bottom cover (501) into the proportional check valve and flows out from the top cover (503); the two ends of the housing (502) are hermetically connected to the top cover (503) and the bottom cover (501), respectively; the housing (502) has an inner diameter gradually increasing from the bottom cover (501) to the top cover (503), and equal to the external diameter of the piston (505) at the end of the bottom cover (501); the bottom cover (501) has a fluid inlet; the top cover (503) has, in the center thereof, a piston rod passage for receiving the piston rod of the piston (505), and the top cover (503) has one or more fluid outlets around the piston rod passage; the piston rod of the piston (505) is inserted into the piston rod passage in the center of the top cover (503), and the piston (505) is movable between the bottom cover (501) and the top cover (503); the elastic member (504) is installed between the piston head of the piston (505) and the top cover (503), and is in a compressed state and tends to push the piston (505) away from the top cover (503); when the proportional check valve is closed, the piston head of the piston (505) contacts and seals the bottom cover (501), and when the proportional check valve is open, fluid flows through the gap between the piston (505) and the housing (502), and the gap between the piston (505) and the housing (502) increases as the fluid pressure increases.

BRIEF DESCRIPTION OF DRAWINGS

The drawings in this specification are intended to illustrate examples of various embodiments of the present invention, and they are provided for illustrative purpose only, and do not in any way limit the scope of the present invention. In the present specification, the same reference signs denote the same or similar parts. In the drawings.

DETAILED DESCRIPTION OF EMBODIMENTS

Examples of various embodiments of the present invention will now be described with reference to the drawings, but the scope of the present invention is not limited to the embodiments described hereinafter.

Figure 1:
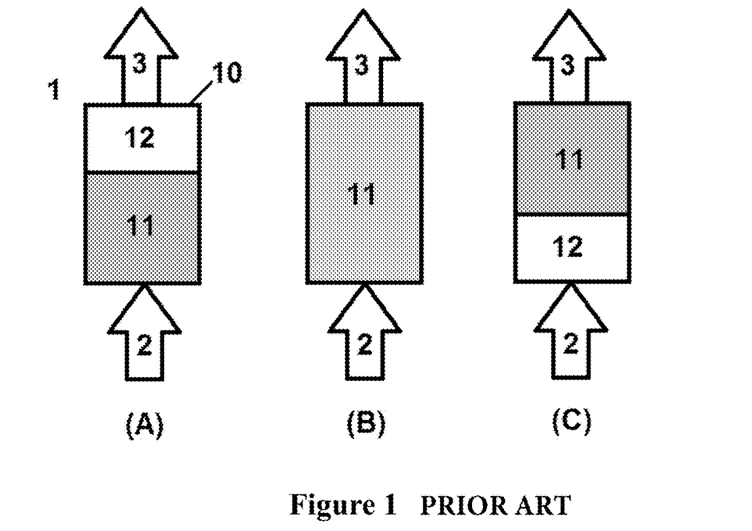
FIG. 1 is a schematic view of a longitudinal section of the column bed unit in a Next-ScaleStop water processing system in the prior art; wherein A, B and C represent different states.

FIG. 1 is a schematic view of a longitudinal section of the only filtration column bed unit 1 in a Next-ScaleStop water processing system in the prior art, wherein 10 refers to a housing of the column bed unit, 11 refers to the TAC medium, 12 refers to the empty bed portion, 2 is a water inlet tube, and 3 is a water outlet tube. FIG. 1A is a schematic view of the column bed unit without any water flow, wherein all of the TAC medium 11 is accumulated at the bottom of the column bed unit, forming a column bed having a height (column bed depth) of 4 inches, and a cross-section (a horizontal section perpendicular to the page) area of 16 in.$^2$; and above it there is an empty bed portion 12 having a height of 2 inches. FIG. 1B is a schematic view of the column bed unit with water just flowing in, wherein the TAC medium 11 is flushed up by the water flow and fills the entire inner space of the housing 10 for the column bed, in which case particles of the TAC medium collide with each other, such that the dirt adhered on the surface of the particles can be removed, to achieve the purpose of cleaning the TAC medium. FIG. 1C is a schematic view during continuous flowing of water, wherein the TAC medium 11 gathers in the upper portion of the column bed unit due to the water pressure, below which is an empty bed portion 12 having a height of about 2 inches and full of water at this time.

The present inventor has investigated the Next-ScaleStop water processing system shown in FIG. 1 and found that the higher the water flow speed is, the higher the hard water conversion will be and the better the effect of scale prevention will be; and meanwhile, the higher the water flow speed is, the more the pressure drop along the TAC water processing medium column bed will be (see Table 1 below, and see Table 3 below for more details). As used herein, the term "hard water conversion" refers to the percentage of the total hard water minerals before processing that are converted into insoluble "crystal seeds" in processed water. The higher the hard water conversion is, the better the water processing effect is.

TABLE 1

Effects of the column bed unit in the Next-ScaleStop water processing system in the prior art

|  | Total flow rate of water flowing to the TAC-based water processing system | | | |
|---|---|---|---|---|
|  | 2.5 gpm | 5.0 gpm | 7.5 gpm | 10.0 gpm |
| Hard water conversion | 25% | 40% | 55% | 70% |
| Pressure drop over the TAC medium column bed | 0.5 psi | 1.0 psi | 1.5 psi | 2.0 psi |
| Water flow speed in the column bed (arbitrary unit) | 1× | 2× | 3× | 4× |

In Table 1 above, the hardness of the inflow water is 12 grains/gallon (gpg), and the unit of flow rate is gallon/minute (gpm).

The present inventor has also found that, for the household tap water system, normal daily water usage is: 85% of water used at a flow rate of about 2.5 gpm, 10% of water used at a flow rate of about 5.0 gpm, and only 5% of water used in other flow rates. Based on such a usage, in the families using Next-ScaleStop, the hard water conversion for most of the water used is about 25% only, rather than 70% (see Table 1 and Table 3).

In order to improve the hard water conversion of a TAC-based system, especially the hard water conversion at a low flow rate, the present inventor has developed a new TAC-based water processing system, wherein the single column bed unit of a conventional TAC-based system has been changed to a plurality of column bed units in parallel connection, and the total cross-sectional area of the plurality of column bed units is substantially the same as that of the single column bed before the change, and the column bed depth of each of the plurality of column bed units is substantially the same as that of the single column bed before the change; and the system is characterized in that, except the first column bed unit, each column bed unit is provided, at the water inlet thereof, with a check valve that opens or closes at predetermined pressure; when the flow speed of the inflow water is low, all check valves are closed, with only the first column bed unit working; when the flow speed of the inflow water is high, the check valves can gradually open one by one to control the operation of more column bed units.

Figure 2A:
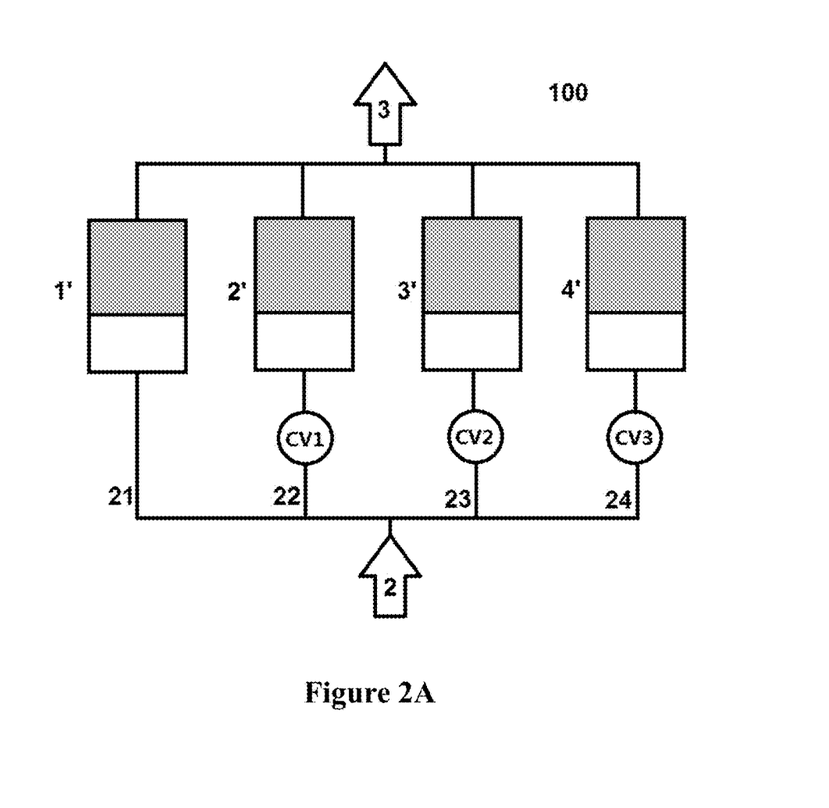
FIG. 2 is a schematic view of an example of a fluid processing system according to an embodiment of the present invention having four column bed units; wherein A and B represent two different connections.

I. A TAC-Based Water Processing System with Four Column Bed Units in Parallel Connection In an exemplary embodiment, as shown in FIG. 2A, a TAC-based water processing system 100 of the present invention comprises: a fluid inlet tube 2 (hereinafter simply referred to as "inlet tube"), four column bed units 1', 2', 3', and 4' in parallel connection, and a fluid outlet tube 3; wherein the inner diameter of the inlet tube 2 is the same as that of the water inlet tube 2 in FIG. 1; the fluid inlet tube 2 branches in a bus topology mode (connection A) into branch tubes 21, 22, 23, and 24 which are in fluid communication with the column bed units 1', 2', 3', and 4', respectively; the cross-sectional area of each column bed unit is ¼ of the cross-sectional area of the column bed unit shown in FIG. 1, i.e., 4 in$^2$; the column bed depth of each column bed unit is the same as the column bed depth of the column bed unit shown in FIG. 1, i.e., 4 inches; the second column bed unit 2', the third column bed unit 3' and the fourth column bed unit 4' are respectively provided with check valves CV1, CV2, and CV3 in the branch tubes 22, 23, and 24 upstream thereof, and the check valves are each configured to open at a specific pressure threshold to allow water flows through, and to close at a specific pressure threshold. In an example of this embodiment, the opening pressure thresholds and the closing pressure thresholds of the check valves are shown in Table 2 below, wherein positive pressure values indicate pressure in the flowing direction of fluid.

TABLE 2

| | Opening pressure threshold | Closing pressure threshold | Flow rate limit | |
|---|---|---|---|---|
| | | | Connection A (FIG. 2A) | Connection B (FIG. 2B) |
| CV1 | 2.0 psi | 0.5 psi | 2.5 gpm | 7.5 gpm |
| CV2 | 2.2 psi | 0.7 psi | 2.5 gpm | 5.0 gpm |
| CV3 | 2.4 psi | 0.9 psi | 2.5 gpm | 2.5 gpm |

The working mechanism of the above TAC-based water processing system 100 under a continuous flow of water is shown in Table 3 below. Specifically, when the total flow rate of continuous water in the inlet tube 2 is 2.5 gpm or less, the system pressure drop is 2 psi or less, and at this time all the three check valves are closed, and only the first column bed unit 1' is working. Since the cross-sectional area of 1' is ¼ of that in FIG. 1, the flow speed of water through 1' becomes four times that in FIG. 1, up to 4×, and the hard water conversion may reach 70%.

When the total flow rate of water in the inlet tube 2 becomes beyond 2.5 gpm from a lower flow rate but is 5.5 gpm or less, the system pressure drop transiently exceeds 2 psi, and the check valve CV1 opens, while CV2 and CV3 are still closed; at this time, the column bed units 1' and 2' are working, and the system pressure drop is stabilized at 1 to 2.2 psi, the total cross-sectional area of the working column beds becomes 2/4 of that of FIG. 1, the flow speed in each column bed unit becomes 2× to 4.4×, so the hard water conversion may reach 40% to 75%.

When the total flow rate of water in the inlet tube 2 becomes beyond 5.5 gpm from a lower flow rate but is 9.0 gpm or less, the system pressure drop transiently exceeds 2.2 psi, and the check valve CV2 also opens, while CV3 is still closed; at this time, the column bed units 1', 2' and 3' are working, and the system pressure drop is stabilized at 1.1 to 2.4 psi, the flow speed in each column bed units becomes 2.2× to 4.8×, so the hard water conversion may reach 43% to 79%.

When the total flow rate of water in the inlet tube 2 becomes beyond 9.0 gpm from a lower flow rate but is 10.0 gpm or less, the system pressure drop transiently exceeds 2.4 psi, and the check valve CV3 also opens; at this time, all the column bed units 1', 2', 3' and 4' are working, and the system pressure drop is stabilized at 1.9 to 2 psi, the flow speed in each column bed unit becomes 2.4× to 4.0×, so the hard water conversion may reach 46% to 70%.

When the user turns off water, the water flow rate returns to 0, and all the check valves are closed; and when water is used again, the system will repeat or partially repeat the above process.

Through the above-described example, with the same total flow rate of water and the same column bed volume (i.e., the amount of the TAC fluid processing medium material), the present invention achieves a hard water conversion significantly higher than that of the conventional TAC-based system as shown in FIG. 1, thereby improving the efficiency of the TAC-based water processing system. The working process and corresponding parameters of the above example and the existing Next-ScaleStop water processing system are summarized in Table 3 below.

The maximum working flow rate of the Next-ScaleStop water processing system used in the above example is 10.0 gpm, and therefore the inventor did not test those over 10.0 gpm. However, those skilled in the art would know that, for the TAC-based water processing systems with a higher nominal maximum working flow rate, the working process of the water processing system of the present invention follows the same pattern, and the number and cross-sectional area of column bed units and branch tubes, and pressure thresholds of each check valve can be adjusted if necessary.

Figure 2B:
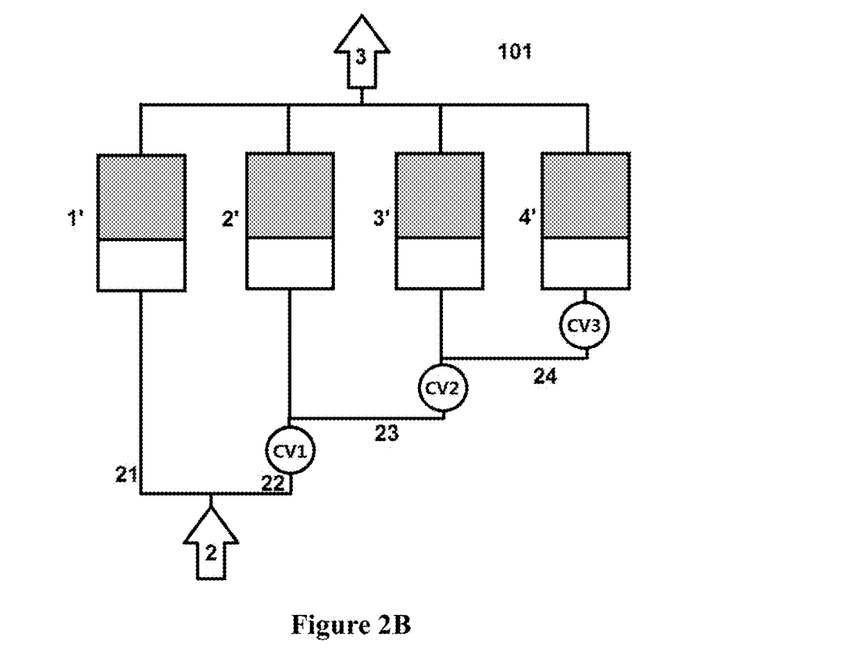

Furthermore, in the above example, according to the actual situation, the branch tubes may be not employed, and the inlet tube 2 may directly communicate with the four column bed units in parallel connection, wherein three column bed units are provided with a check valve at their inlets; at this time, the cross-sectional area of the inlet tube is preferably equal to or substantially equal to the total cross-sectional area of the four column bed units.

mum flow rate through each check valve is 2.5 gpm; for the embodiment shown in FIG. 2B, the maximum flow rates through the check valves CV1, CV2, and CV3 are 7.5 gpm, 5.0 gpm, and 2.5 gpm, respectively.

In addition, in order to further reduce this fluctuation, upstream of each column bed unit one original check valve may be replaced with two or more check valves in parallel connection that have different opening pressure thresholds from each other. In this case, the more check valves are connected in parallel, the less fluctuation in the water flow will be. For example, in FIG. 2C, CV11 and CV12 in parallel are used to replace CV1 in FIG. 2A, and the opening pressure thresholds of CV11 and CV12 are 2.0 psi and 2.1 psi, respectively, and the flow rate limits are 1.25 gpm for both of them; CV21 and CV22 in parallel are used to replace CV2 in FIG. 2A, and the opening pressure thresholds of CV21 and CV22 are 2.2 psi and 2.3 psi, respectively, and their flow rate limits are 1.25 gpm; CV31 and CV32 in parallel are used to replace CV3 in FIG. 2A, the opening

TABLE 3

Working mechanism of a TAC-based water processing system having four column bed units in parallel with on-off check valves, in comparison with the existing Next-ScaleStop water processing system.

| | TAC-based water processing system in the prior art | | | TAC-based water processing system having four column bed units in parallel of the present invention | | | | | | | | |
|---|---|---|---|---|---|---|---|---|---|---|---|---|
| Total flow rate of water (GPM) | Stable pressure drop (psi) | Hard water conversion | Water flow speed in column bed(s) | Stable system pressure drop (psi) | CV1 | CV2 | CV3 | Hard water conversion | Water flow speed in column bed 1' | Water flow speed in column bed 2' | Water flow speed in column bed 3' | Water flow speed in column bed 4' |
| 0 | 0 | 0 | 0 | 0 | closed | closed | closed | 0 | 0 | — | — | — |
| 0.5 | 0.1 | 13% | 0.2× | 0.4 | closed | closed | closed | 22% | 0.8× | — | — | — |
| 1.0 | 0.2 | 16% | 0.4× | 0.8 | closed | closed | closed | 34% | 1.6× | — | — | — |
| 1.5 | 0.3 | 19% | 0.6× | 1.2 | closed | closed | closed | 46% | 2.4× | — | — | — |
| 2.0 | 0.4 | 22% | 0.8× | 1.6 | closed | closed | closed | 58% | 3.2× | — | — | — |
| 2.5 | 0.5 | 25% | 1.0× | 2 | closed | closed | closed | 70% | 4.0× | — | — | — |
| 3.0 | 0.6 | 28% | 1.2× | 1.2 | opened | closed | closed | 46% | 2.4× | 2.4× | — | — |
| 3.5 | 0.7 | 31% | 1.4× | 1.4 | opened | closed | closed | 52% | 2.8× | 2.8× | — | — |
| 4.0 | 0.8 | 34% | 1.6× | 1.6 | opened | closed | closed | 58% | 3.2× | 3.2× | — | — |
| 4.5 | 0.9 | 37% | 1.8× | 1.8 | opened | closed | closed | 64% | 3.6× | 3.6× | — | — |
| 5.0 | 1 | 40% | 2.0× | 2 | opened | closed | closed | 70% | 4.0× | 4.0× | — | — |
| 5.5 | 1.1 | 43% | 2.2× | 2.2 | opened | closed | closed | 75% | 4.4× | 4.4× | — | — |
| 6.0 | 1.2 | 46% | 2.4× | 1.6 | opened | opened | closed | 58% | 3.2× | 3.2× | 3.2× | — |
| 6.5 | 1.3 | 49% | 2.6× | 1.73 | opened | opened | closed | 62% | 3.5× | 3.5× | 3.5× | — |
| 7.0 | 1.4 | 52% | 2.8× | 1.87 | opened | opened | closed | 68% | 3.7× | 3.7× | 3.7× | — |
| 7.5 | 1.5 | 55% | 3.0× | 2 | opened | opened | closed | 70% | 4.0× | 4.0× | 4.0× | — |
| 8.0 | 1.6 | 58% | 3.2× | 2.13 | opened | opened | closed | 73% | 4.3× | 4.3× | 4.3× | — |
| 8.5 | 1.7 | 61% | 3.4× | 2.26 | opened | opened | closed | 76% | 4.5× | 4.5× | 4.5× | — |
| 9.0 | 1.8 | 64% | 3.6× | 2.4 | opened | opened | closed | 79% | 4.8× | 4.8× | 4.8× | — |
| 9.5 | 1.9 | 67% | 3.8× | 1.9 | opened | opened | opened | 67% | 3.8× | 3.8× | 3.8× | 3.8× |
| 10.0 | 2 | 70% | 4.0× | 2 | opened | opened | opened | 70% | 4.0× | 4.0× | 4.0× | 4.0× |

In another exemplary embodiment, in the TAC-based water processing system 101 as shown in FIG. 2B, the inlet tube 2 branches in tree topology, the check valve CV1 is installed in a common branch tube 22 upstream of the second column bed unit 2' and the third column bed unit 3', the check valve CV2 is installed in a common branch tube 23 upstream of the third column bed unit 3' and the fourth column bed unit 4', and the check valve CV3 is installed only in the branch tube 24 upstream of the third column bed unit 3'. In this case, the opening pressure thresholds and the closing pressure thresholds of these check valves are shown in Table 2.

For a simple on-off check valve, its opening/closing causes a sudden change in water flow, resulting in fluctuations of the flow rate. In order to control the fluctuation, flow rate limits are set for these check valves (see Table 2 above). That is, for the embodiment shown in FIG. 2A, the maxipressure thresholds of CV31 and CV32 are 2.4 psi and 2.5 psi, respectively, and their flow rate limits are 1.25 gpm; therefore, a smoother gradient in pressure threshold is achieved, so that the variation of the flow path with pressure is more precisely controlled, and the fluctuation caused by on/off of the check valves is reduced. It should be understood that, the larger the number of check valves in parallel having different opening pressure thresholds is, the smaller the fluctuation in water flow after the replacement will be. It should be understood that one or more check valves in FIG. 2B can also be replaced similarly. It should also be understood that the above pressure thresholds 2.0 psi, 2.1 psi, 2.2 psi, 2.3 psi, 2.4 psi and 2.5 psi are exemplary only, and the opening pressure threshold can be adjusted to any values as needed.

Figure 2C:
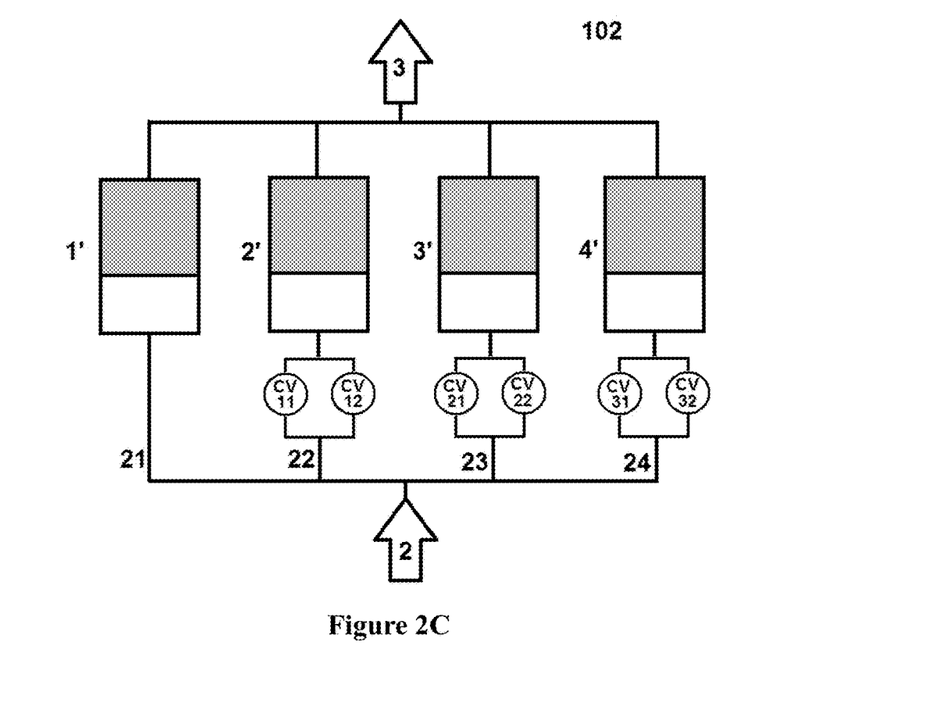

It should be noted that the present invention is not limited to four parallel column bed units, and fewer or more column bed units can be used if needed; and the connection of check valves may be the connection shown in FIG. 2A, FIG. 2B, FIG. 2C or any combination thereof.

In another embodiment of the present invention, the check valve used is a check valve that opens proportionally to the pressure, simply referred to as proportional check valve. The use of a proportional check valve allows the flow speed of water to be very stable and smooth in the entire variation range, and the overall flow speed can be maintained at a high level due to its gradual opening.

Figure 6:
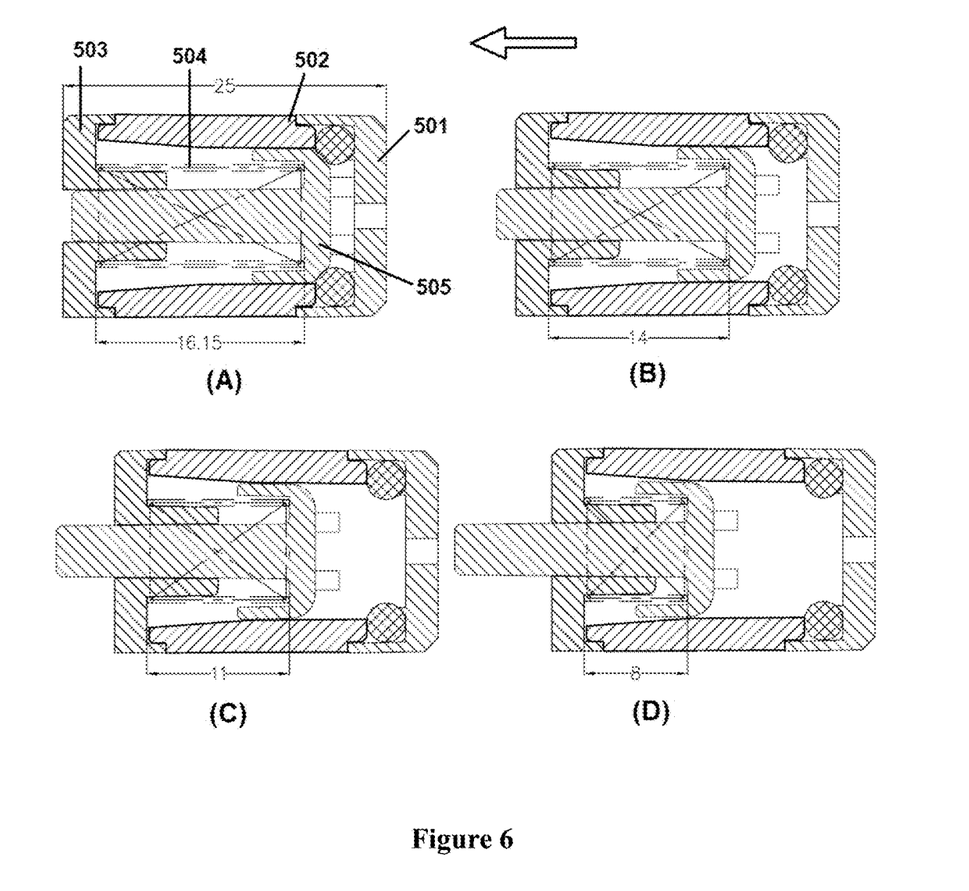
FIGS. 6 and 7 are structural diagrams of the proportional check valve of the present invention.
Figure 7:
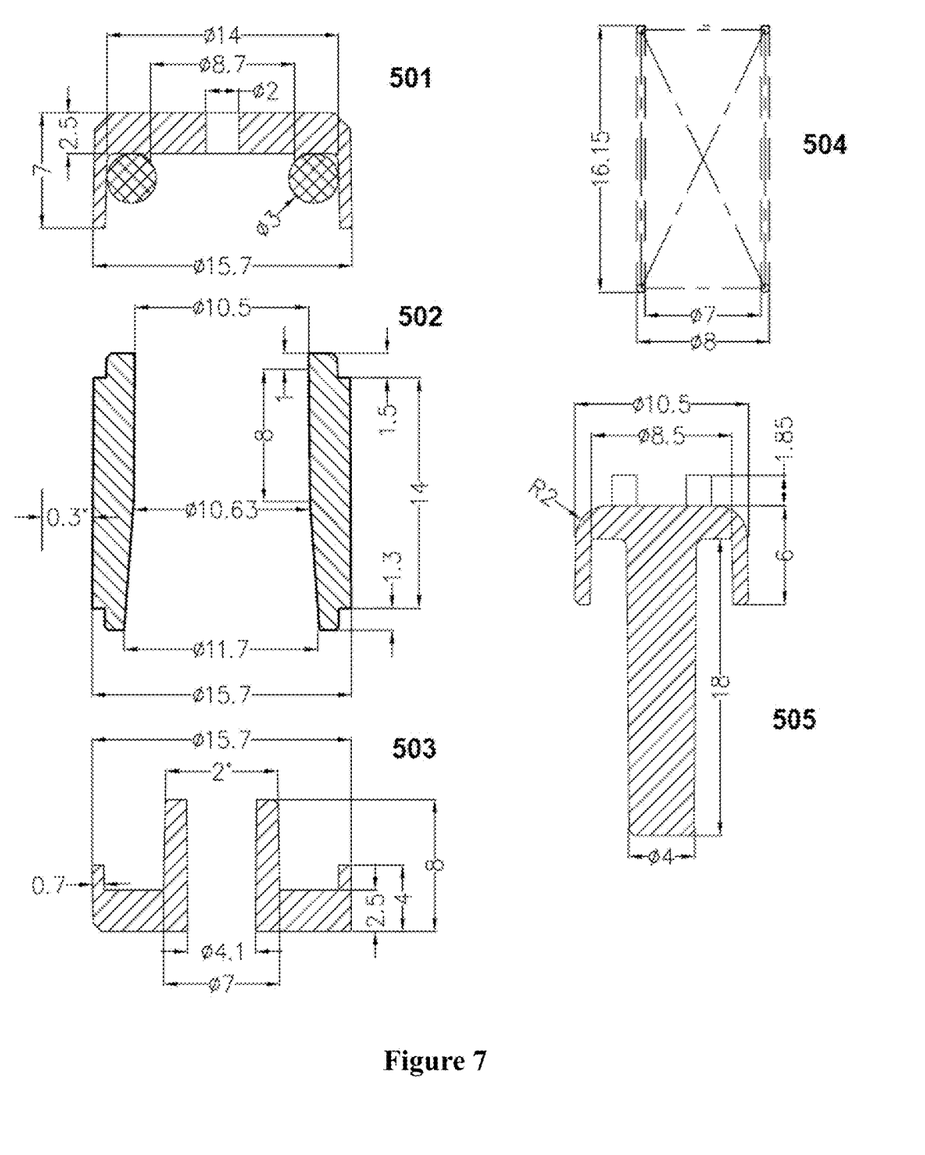

A cross-sectional view showing the structure of an example of the proportional check valve is shown in FIG. 6, wherein the proportional check valve includes a bottom cover 501, a housing 502, a top cover 503, an elastic member 504 and a piston 505; each member is symmetric with respect to the central axis of the piston 505 in the direction indicated by the arrow, and the individual view and dimension of each member are shown in FIG. 7. In FIG. 6, the direction indicated by the arrow is the fluid inflow direction; the housing 502 is hermetically connected to the top cover 503 at the downstream end of water flow, and hermetically connected to the bottom cover 501 at the upstream end of the water flow; the inner wall of the housing 502 has the shape of a segmented, truncated cone, and its inner diameter at the bottom of the housing 502 (i.e., the position connected to the bottom cover 501) is 10.5 mm, and then gradually and linearly increases to 10.63 mm in the middle portion, and then linearly becomes 11.7 mm at the bottom (see FIG. 7). The bottom cover 501 has a hole with a diameter of 2 mm in the center, and a seal ring having a diameter of 3 mm in cross section is provided around the inner wall of the bottom cover. The top cover 503 has a piston rod passage with a diameter of 4.1 mm in the center for receiving the piston rod of the piston 505, and water outlet holes for water flow are opened on the surface of the top cover around the piston rod passage. The piston rod of the piston 505 is inserted into the piston rod passage in the center of the top cover 503, and the piston is movable between the bottom cover 501 and the top cover 503. The elastic member 504 is installed between the piston head of the piston 505 and the top cover 503, and the elastic member 504 is in a compressed state, and its elastic force tends to push the piston 505 away from the top cover 503. The outer diameter of the piston 505 is 10.5 mm, equal to the inner diameter of the housing 502 at the fluid entry end.

When the proportional check valve is closed, as shown in FIG. 6A, under the pressure from the elastic member 504, the piston 505 closely contacts the bottom of the housing 502 and the seal ring of the bottom cover 501, such that water flow cannot pass through. When the water pressure exceeds the predetermined pressure threshold, the piston 505 begins to move towards the top cover 503; and since the inner wall of the housing 502 gradually becomes wider in the water flow direction, water begins to flow through the gap between the housing 502 and the piston 505 (see FIG. 6B). With the increase of the water pressure, the piston 505 continuously moves towards the top cover 503, the gap between the housing 502 and the piston 505 is increased, and the water flow is also increased (see FIG. 6C). When the pressure reaches the nominal maximum, the proportional check valve is fully opened (see FIG. 6D).

When all the check valves in FIG. 2A are replaced with proportional check valves, the working process and corresponding parameters thereof are summarized in Table 4 below. Herein, the pressure thresholds and flow rate limits of the proportional check valves are shown in Table 2. As seen from Table 4, the TAC-based water processing system using the proportional check valves has a smaller range of flow rate variation, so that the hard water conversion is not only significantly higher than that of the Next-ScaleStop in the prior art, but also higher than that of the configurations using on-off check valves.

In view of the features of a proportional check valve, the same or similar effect as the prior art can be achieved with fewer column bed units and less TAC water processing medium. Thus, in other embodiments of the present invention mentioned below, a water processing apparatus using less column bed units and TAC medium is provided, which can greatly reduce the cost.

II. TAC-Based Water Processing System Having Two Column Bed Units in Parallel

Figure 3:
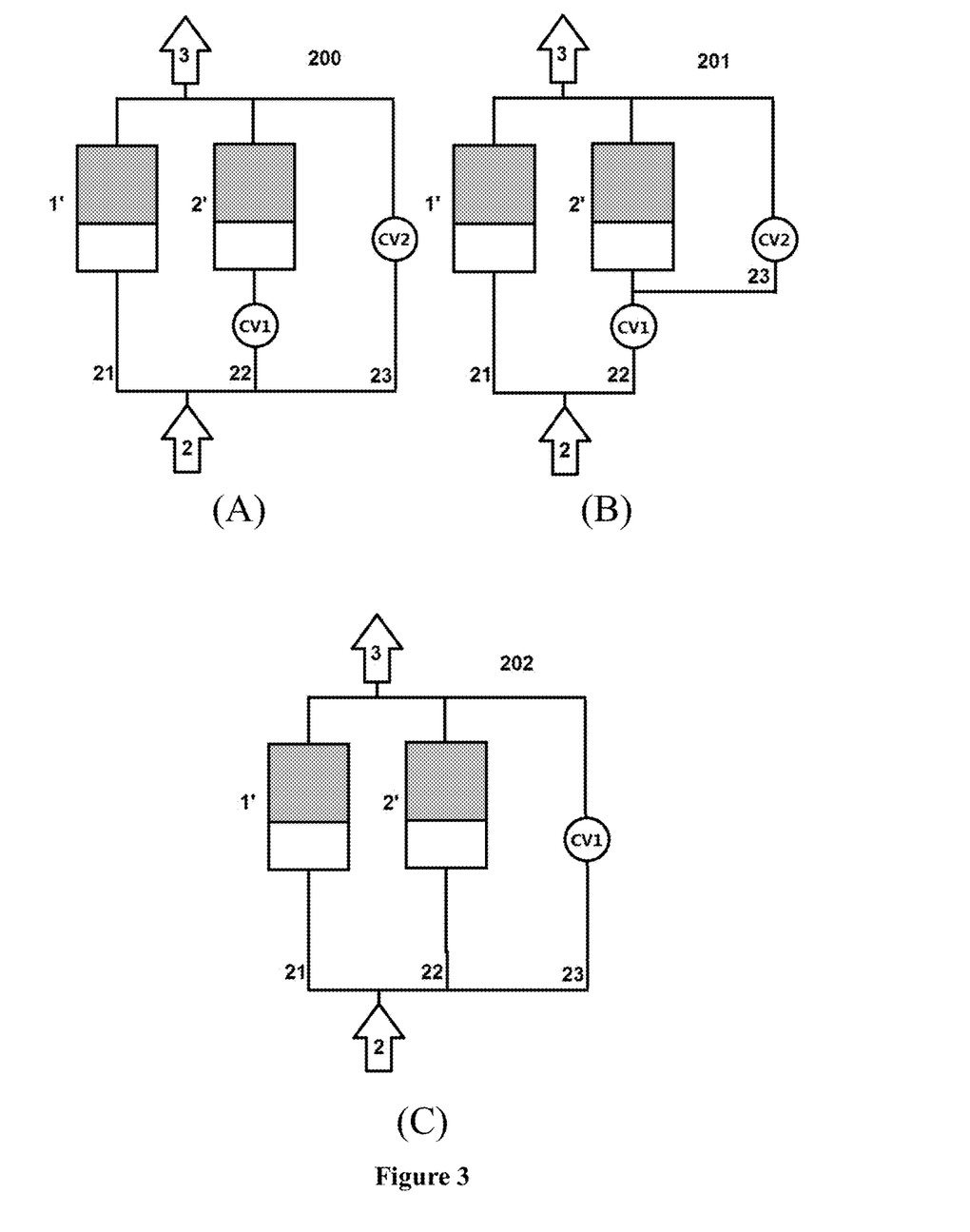
FIG. 3 is a schematic view of an example of a fluid processing system according to an embodiment of the present invention having two column bed units; wherein A, B and C represent three different connections.

An example of the TAC-based water processing system of the present invention having two column bed units is shown in FIG. 3A. The TAC-based water processing system 200 comprises: an inlet tube 2, branch tubes 21, 22, and 23, two column bed units 1' and 2' in parallel, and an outlet tube 3; wherein the cross-sectional area of each column bed unit is ¼ of the cross-sectional area of the column bed unit shown in FIG. 1, and the column bed depth is substantially the same as that in FIG. 1; a proportional check valve CV1 is installed in the branch tube 22 upstream of the second column bed unit 2'; another proportional check valve CV2 is installed in the branch tube 23, and is in parallel connection with the column bed units 1' and 2'. The branch tube 23 serves as a bypass flow path, and the water flow therein does not pass through the TAC medium but directly flows into the outlet tube 3. The pressure thresholds and flow rate limits of the proportional check valves CV1 and CV2 are as shown in Table 2 above.

The working process and corresponding parameters of the above TAC-based water processing system 200 are summarized in Table 5 below. Unlike the previous embodiment, in the system 200, when the flow rate of water is high, a portion of water will directly flow through the bypass flow path (i.e., the branch tube 23) and does not flow through the TAC medium; when CV2 is open, the percentage of the water in the bypass flow path increases with the increase of water flow in the inlet tube (see Table 5). At this time, since a portion of water is not treated, the actual hard water conversion is:

Theoretical hard water conversion*(1−Bypass %).

Thus, the hard water conversion of the system 200 at a high flow rate (when the total flow rate of water is 7.5 gpm or more) is not as good as that of the system of the prior art shown in FIG. 1. However, since such a high flow rate represents only 5% or less usage in daily life, in most cases the hard water conversion of the system 200 is still significantly higher than that of the TAC-based water processing system in the prior art. Moreover, the amount of the TAC medium used in the TAC system 200 is only half of that of the prior art shown in FIG. 1. That is, with a proportional check valve, the above example achieves an overall higher hard water conversion with the column bed medium halved, and the actual efficiency is greatly enhanced.

Similar to the embodiment in FIG. 2, the system with two column bed units of the above embodiment may also employ the connection of the check valves shown in FIG. 3B (i.e., connection B).

TABLE 4

Working mechanism of a TAC-based water processing system having four parallel column bed units with proportional check valves, in comparison with the existing Next-ScaleStop water processing system.

| | TAC-based water processing system of the prior art | | | TAC-based water processing system of the present invention having four column bed units in parallel | | | | | | | | |
|---|---|---|---|---|---|---|---|---|---|---|---|---|
| Total water flow rate (GPM) | Stable pressure drop (psi) | Hard water conversion | Water flow speed in column bed | Stable system pressure drop (psi) | CV1 | CV2 | CV3 | Hard water conversion | Water flow speed in column bed 1' | Water flow speed in column bed 2' | Water flow speed in column bed 3' | Water flow speed in column bed 4' |
| 0 | 0 | 0 | 0 | 0 | closed | closed | closed | 0 | 0 | — | — | — |
| 0.5 | 0.1 | 13% | 0.2× | 0.4 | closed | closed | closed | 22% | 0.8× | — | — | — |
| 1.0 | 0.2 | 16% | 0.4× | 0.8 | closed | closed | closed | 34% | 1.6× | — | — | — |
| 1.5 | 0.3 | 19% | 0.6× | 1.2 | closed | closed | closed | 46% | 2.4× | — | — | — |
| 2.0 | 0.4 | 22% | 0.8× | 1.6 | closed | closed | closed | 58% | 3.2× | — | — | — |
| 2.5 | 0.5 | 25% | 1.0× | 2 | closed | closed | closed | 70% | 4.0× | — | — | — |
| 3.0 | 0.6 | 28% | 1.2× | 1.95 | opened | closed | closed | 68% | 3.9× | 3.9× | — | — |
| 3.5 | 0.7 | 31% | 1.4× | 2 | opened | closed | closed | 70% | 4.0× | 4.0× | — | — |
| 4.0 | 0.8 | 34% | 1.6× | 2.05 | opened | closed | closed | 71% | 4.1× | 4.1× | — | — |
| 4.5 | 0.9 | 37% | 1.8× | 2.1 | opened | closed | closed | 73% | 4.2× | 4.2× | — | — |
| 5.0 | 1 | 40% | 2.0× | 2.15 | opened | closed | closed | 74% | 4.3× | 4.3× | — | — |
| 5.5 | 1.1 | 43% | 2.2× | 2.2 | opened | closed | closed | 76% | 4.4× | 4.4× | — | — |
| 6.0 | 1.2 | 46% | 2.4× | 2.15 | opened | opened | closed | 74% | 4.3× | 4.3× | 4.3× | — |
| 6.5 | 1.3 | 49% | 2.6× | 2.2 | opened | opened | closed | 76% | 4.4× | 4.4× | 4.4× | — |
| 7.0 | 1.4 | 52% | 2.8× | 2.15 | opened | opened | closed | 74% | 4.3× | 4.3× | 4.3× | — |
| 7.5 | 1.5 | 55% | 3.0× | 2.2 | opened | opened | closed | 76% | 4.4× | 4.4× | 4.4× | — |
| 8.0 | 1.6 | 58% | 3.2× | 2.25 | opened | opened | closed | 77% | 4.5× | 4.5× | 4.5× | — |
| 8.5 | 1.7 | 61% | 3.4× | 2.3 | opened | opened | closed | 79% | 4.6× | 4.6× | 4.6× | — |
| 9.0 | 1.8 | 64% | 3.6× | 2.35 | opened | opened | closed | 80% | 4.7× | 4.7× | 4.7× | — |
| 9.5 | 1.9 | 67% | 3.8× | 2.4 | opened | opened | closed | 82% | 4.8× | 4.8× | 4.8× | — |
| 10.0 | 2 | 70% | 4.0× | 2.35 | opened | opened | opened | 80% | 4.7× | 4.7× | 4.7× | 4.7× |

TABLE 5

Working mechanism of a TAC-based water processing system having two parallel column bed units with proportional check valves, in comparison with the existing Next-ScaleStop water processing system.

| | TAC-based water processing system of the prior art | | | TAC-based water processing system of the present invention having two column bed units in parallel | | | | | | | |
|---|---|---|---|---|---|---|---|---|---|---|---|
| Total water flow rate (GPM) | Stable pressure drop (psi) | Hard water conversion | Water flow speed in column bed | Stable system pressure drop (psi) | CV1 | CV2 | Theoretic hard water conversion | Actual hard water conversion | Water flow speed in column bed 1' | Water flow speed in column bed 2' | Ratio of water flow in bypass flow path |
| 0 | 0 | 0 | 0 | 0 | closed | closed | 0 | 0 | 0 | — | 0 |
| 0.5 | 0.1 | 13% | 0.2× | 0.4 | closed | closed | 22% | 22% | 0.8× | — | 0 |
| 1.0 | 0.2 | 16% | 0.4× | 0.8 | closed | closed | 34% | 34% | 1.6× | — | 0 |
| 1.5 | 0.3 | 19% | 0.6× | 1.2 | closed | closed | 46% | 46% | 2.4× | — | 0 |
| 2.0 | 0.4 | 22% | 0.8× | 1.6 | closed | closed | 58% | 58% | 3.2× | — | 0 |
| 2.5 | 0.5 | 25% | 1.0× | 2 | closed | closed | 70% | 70% | 4.0× | — | 0 |
| 3.0 | 0.6 | 28% | 1.2× | 1.6 | opened | closed | 58% | 58% | 3.2× | — | 0 |
| 3.5 | 0.7 | 31% | 1.4× | 1.75 | opened | closed | 62% | 62% | 3.5× | — | 0 |
| 4.0 | 0.8 | 34% | 1.6× | 1.9 | opened | closed | 67% | 67% | 3.8× | — | 0 |
| 4.5 | 0.9 | 37% | 1.8× | 2.05 | opened | closed | 71% | 71% | 4.1× | — | 0 |
| 5.0 | 1 | 40% | 2.0× | 2.2 | opened | closed | 76% | 76% | 4.4× | — | 0 |
| 5.5 | 1.1 | 43% | 2.2× | 1.8 | opened | opened | 64% | 60.80% | 3.6× | 3.6× | 5% |
| 6.0 | 1.2 | 46% | 2.4× | 1.85 | opened | opened | 65% | 58.50% | 3.7× | 3.7× | 10% |
| 6.5 | 1.3 | 49% | 2.6× | 1.9 | opened | opened | 67% | 56.95% | 3.8× | 3.8× | 15% |
| 7.0 | 1.4 | 52% | 2.8× | 1.95 | opened | opened | 68% | 54.40% | 3.9× | 3.9× | 20% |
| 7.5 | 1.5 | 55% | 3.0× | 2 | opened | opened | 70% | 52.50% | 4.0× | 4.0× | 25% |
| 8.0 | 1.6 | 58% | 3.2× | 2.05 | opened | opened | 71% | 49.70% | 4.1× | 4.1× | 30% |
| 8.5 | 1.7 | 61% | 3.4× | 2.1 | opened | opened | 73% | 47.45% | 4.2× | 4.2× | 35% |
| 9.0 | 1.8 | 64% | 3.6× | 2.15 | opened | opened | 74% | 44.40% | 4.3× | 4.3× | 40% |
| 9.5 | 1.9 | 67% | 3.8× | 2.2 | opened | opened | 76% | 34.20% | 4.4× | 4.4× | 45% |
| 10.0 | 2 | 70% | 4.0× | 2.25 | opened | opened | 77% | 38.50% | 4.5× | 4.5× | 50% |

Furthermore, in the system shown in FIG. 3A, the proportional check valves may be further reduced. For example, as shown in FIG. 3C, only one proportional check valve CV1 is used in the bypass flow path.

III. TAC-Based Processing System Having a Single Column Bed Unit

Figure 4:
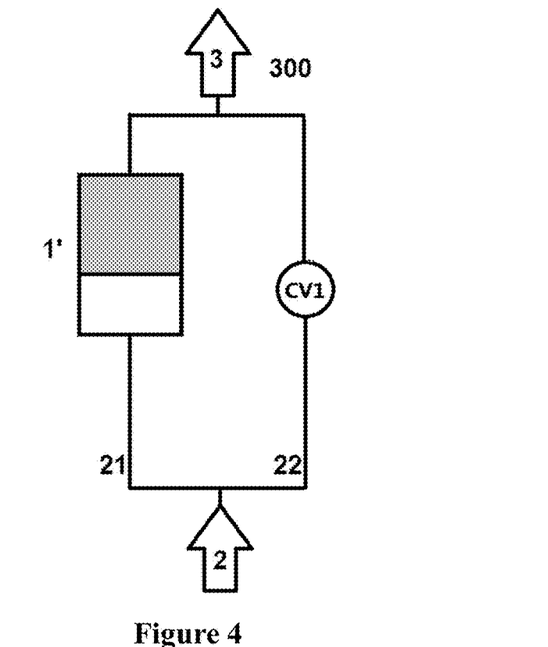
FIG. 4 is a schematic view of an example of a fluid processing system according to an embodiment of the present invention having a single column bed unit.

In another embodiment of the present invention, when the proportional check valve is used, the TAC-based water processing system may use only one column bed unit, which further saves cost. An example of such a TAC-based water processing system with a single column bed unit is shown in FIG. 4, and the TAC-based water processing system 300 comprises: an inlet tube 2, branch tubes 21 and 22, a column bed unit 1', and an outlet tube 3; wherein the cross-sectional area of the column bed unit is ¼ of the cross-sectional area of the column bed unit shown in FIG. 1, and the column bed depth is substantially the same as that of FIG. 1; the branch tube 22 serves as a bypass flow path and has a proportional check valve CV1 installed therein; and the pressure threshold and flow rate limit of CV1 are as shown in Table 2 above.

Figure 5:
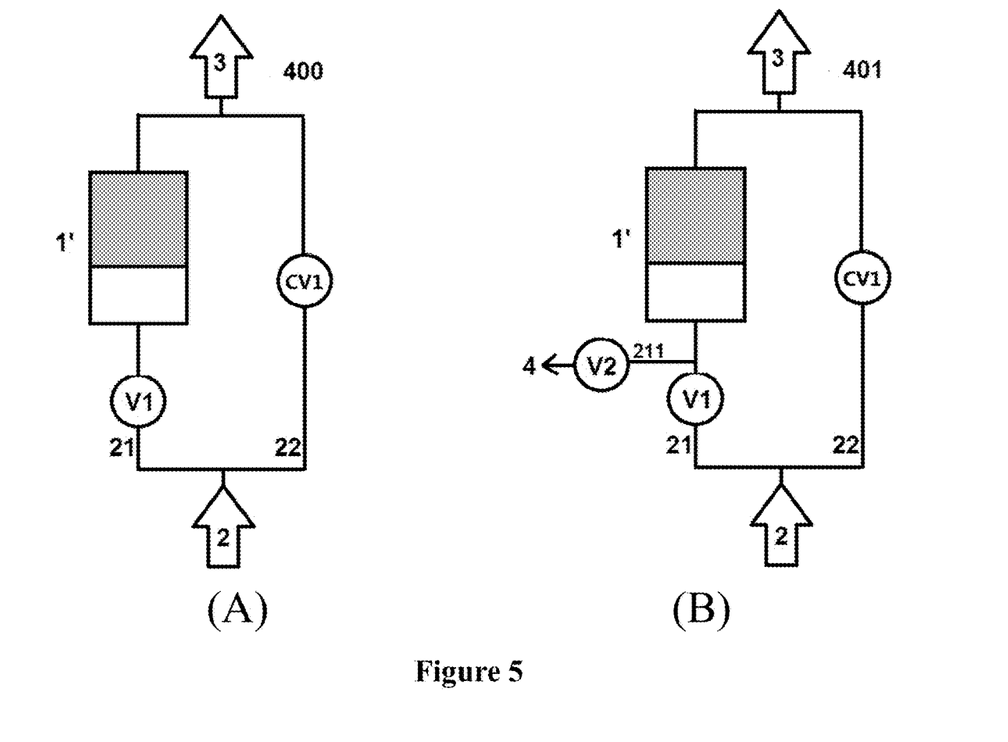
FIG. 5 is a schematic view of an example of a fluid processing system according to an embodiment of the present invention having a single column bed unit; wherein A and B represent two different connections.

The working process and corresponding parameters of the above TAC-based water processing system 200 are summarized in Table 6 below.

tinuous water flow, comprising: at least one control valve working in an automatic mode and configured to open/close at specified frequency and/or at a predetermined time. An example of the apparatus is shown in FIG. 5A, which corresponds to a system shown in FIG. 4 wherein a control valve V1 working in an automatic mode is installed upstream of the column bed unit 1'. When V1 is closed, all of the water flow passes through the bypass flow path rather than the TAC medium, so the TAC medium will be slowly deposited at the bottom of the column bed unit (for example, for the existing TAC-based water processing system, it

TABLE 6

Working mechanism of a TAC-based water processing system having a single column bed unit and a proportional check valve, in comparison with the existing Next-ScaleStop water processing system.

| | TAC-based water processing system of the prior art | | | TAC-based water processing system of the present invention having a single column bed | | | | | |
|---|---|---|---|---|---|---|---|---|---|
| Total water flow rate (GPM) | Stable pressure drop (psi) | Hard water conversion | Water flow speed in column bed | Stable system pressure drop (psi) | CV1 | Theoretic hard water conversion | Actual hard water conversion | Water flow speed in column bed 1' | Ratio of water flow in bypass flow path |
| 0 | 0 | 0 | | 0 | closed | 0 | 0 | 0 | 0 |
| 0.5 | 0.1 | 13% | 0.2× | 0.4 | closed | 22% | 22% | 0.8× | 0 |
| 1.0 | 0.2 | 16% | 0.4× | 0.8 | closed | 34% | 34% | 1.6× | 0 |
| 1.5 | 0.3 | 19% | 0.6× | 1.2 | closed | 46% | 46% | 2.4× | 0 |
| 2.0 | 0.4 | 22% | 0.8× | 1.6 | closed | 58% | 58% | 3.2× | 0 |
| 2.5 | 0.5 | 25% | 1.0× | 2 | closed | 70% | 70% | 4.0× | 0 |
| 3.0 | 0.6 | 28% | 1.2× | 1.60 | opened | 58% | 55.10% | 3.2× | 5% |
| 3.5 | 0.7 | 31% | 1.4× | 1.65 | opened | 59% | 53.10% | 3.3× | 10% |
| 4.0 | 0.8 | 34% | 1.6× | 1.70 | opened | 61% | 51.85% | 3.4× | 15% |
| 4.5 | 0.9 | 37% | 1.8× | 1.75 | opened | 62% | 49.60% | 3.5× | 20% |
| 5.0 | 1 | 40% | 2.0× | 1.80 | opened | 64% | 48% | 3.6× | 25% |
| 5.5 | 1.1 | 43% | 2.2× | 1.85 | opened | 65% | 45.50% | 3.7× | 30% |
| 6.0 | 1.2 | 46% | 2.4× | 1.90 | opened | 67% | 43.55% | 3.8× | 35% |
| 6.5 | 1.3 | 49% | 2.6× | 1.95 | opened | 68% | 40.80% | 3.9× | 40% |
| 7.0 | 1.4 | 52% | 2.8× | 2.00 | opened | 70% | 38.50% | 4.0× | 45% |
| 7.5 | 1.5 | 55% | 3.0× | 2.05 | opened | 71% | 35.50% | 4.1× | 50% |
| 8.0 | 1.6 | 58% | 3.2× | 2.10 | opened | 73% | 32.85% | 4.2× | 55% |
| 8.5 | 1.7 | 61% | 3.4× | 2.15 | opened | 74% | 29.60% | 4.3× | 60% |
| 9.0 | 1.8 | 64% | 3.6× | 2.20 | opened | 76% | 26.60% | 4.4× | 65% |
| 9.5 | 1.9 | 67% | 3.8× | 2.25 | opened | 77% | 23.10% | 4.5× | 70% |
| 10.0 | 2 | 70% | 4.0× | 2.30 | opened | 79% | 19.75% | 4.6× | 75% |

As can be seen from Table 6, although the hard water conversion of the TAC-based system 300 of the present invention having a single column bed is not as good as that of the system 1 of FIG. 1 at a high flow rate (when the total flow rate of water is 6.0 gpm or more), the system 300 of the present invention is still significantly better than the system 1 at low flow rates which represent 85% or more of the usage, and the amount of the TAC medium used in the system 300 of the present invention is only ¼ of that of the system 1.

Those skilled in the art will understand that, at the inlets of the column bed units in the systems 200, 201, 202 and 300 of the present invention, the original single proportional check valve may be replaced with multiple proportional check valves in parallel, so that variation in water flow would become smoother.

IV. Continuously Cleaning TAC-Based Water Processing System

As mentioned above, the TAC medium in the TAC-based fluid processing system of the prior art will be deposited at the bottom of the column bed in the absence of water flow, and will be cleaned by collisions between the medium particles upon reopening of the water flow. However, during continuous water flow, the medium are not cleaned.

To address this problem, the present invention provides an apparatus capable of cleaning the TAC medium under conneeds up to about 30 seconds for the TAC medium to be completely deposited at the bottom of the column bed unit). When V1 is opened, the water flow will push the TAC medium to the top of the column bed unit, and the TAC medium is cleaned in this process, and then the system works as shown in FIG. 4.

In the above apparatus, the cleaning effect depends on the frequency of the openings/closings of V1; the higher the frequency is, the better the cleaning effect is, although excessively high frequency results in too much water flowing through the bypass flow path, thereby reducing the actual hard water conversion. For example, if the frequency of openings/closings of V1 is 30/hour, the total duration of water completely passing through the bypass 22 is about 15 minutes, representing as high as 25% of the total amount of water, which would significantly affect the actual hard water conversion. Thus, in the system shown in FIG. 5A, the frequency of openings/closings of V1 is preferably 30/hour or less, more preferably 20/hour or less.

In order to improve the cleaning effect while maintaining a high conversion of hard water, the present invention further provides another continuously cleaning TAC-based water processing system, which includes two control valves working in an automatic mode. For example, as shown in FIG. 5B, a discharge bypass 211 is connected in the line between the column bed unit 1' and the control valve V1 working in an automatic mode, and a control valve V2 working in an automatic mode, of which the outlet is connected to a drain tank 4, is installed in the discharge bypass 211. When V1 is closed, V2 is opened, and the water in the column bed unit 1' flows reversely through V2 and is discharged, in which case it needs only about 3 seconds for the TAC medium to be completely deposited at the bottom of the column bed unit. In this apparatus, if the frequency of openings/closings of V1 is 30/hour, the total duration of water completely passing through the bypass 22 is only about 1.5 minutes, representing only 2.5% of the total amount of water, which has little effect on the actual hard water conversion. Not only a high cleaning effect is ensured, but also a high hard water conversion is maintained, although a small portion of water is wasted.

Those skilled in the art will understand that, in the various systems disclosed herein, it is also possible to install one or more control valves mentioned above, in order to achieve the purpose of cleaning the TAC medium.

V. Crystal Growth Medium (CGM)

The present application also relates to a method for improving the growth of crystal seeds in a TAC-based water processing system, comprising: adding a crystal growth medium to the TAC-based water processing system. The crystal growth medium is a medium that provides a surface for temporarily adsorbing "crystal seeds" of a specific substance, and has one or more of the following characteristics: 1) having an attractive charge, 2) having a rough surface with a plurality of micropores for adsorbing the "crystal seeds", 3) having a chemical attraction force, 4) having a physical attraction force; and 5) having any other possible means for adsorbing. The larger the surface is, the better the adsorption effect is. The "crystal seeds" of the specific substance may be crystal of any substance, for example, crystal of hard water minerals. An example of the crystal growth medium is GAC (granular activated carbon) and Next-Sand, both of which have a large surface area and charges. The crystal growth medium may be mixed with the TAC medium and together fill the column bed units, or may be separately connected downstream of the TAC medium column bed unit The use of a crystal growth medium may further improve the hard water conversion.

The foregoing description of the embodiments of the present invention has been provided for the purposes of illustration and description. It is not intended to be exhaustive or to limit the invention to the precise forms disclosed. Obviously, many modifications and variations will be apparent to those skilled in the art. The embodiments were chosen and described in order to best explain the principles of the invention and its practical applications, thereby enabling others skilled in the art to understand various embodiments and various modifications of the invention suitable for a particular use contemplated. It is intended that the scope of the invention be defined by the following claims and their equivalents.

The invention claimed is:

1. A fluid processing apparatus, comprising:
   a fluid inlet tube, N column bed units in parallel connection, and a fluid outlet tube;
   each column bed unit containing a crystallization promoting medium (CPM) as a fluid processing medium for processing the fluid flowing therein;
   said N column bed units are all in fluid communication with the fluid inlet tube;
   wherein N is an integer greater than 1, and except a first one of the column bed units, each column bed unit is provided with one check valve upstream thereof in an inflow direction, each check valve being designed to open and close under a specific fluid pressure;
   wherein when a total number of the check valves is two or more, at least two check valves have different opening pressure thresholds and different closing pressure thresholds from each other;
   wherein the CPM is a medium having nucleation sites of an atomic size on its surface which promote formation of crystals of a substance, when the substance dissolved in a fluid flows through the CPM, the substance is to form a crystal and grow at the nucleation sites, when the crystal grows to a certain size, the crystal is flushed off by the fluid to release reusable nucleation sites.

2. The apparatus according to claim 1, wherein a total amount of the CPM fluid processing medium in said N column bed units is less than or substantially equal to a total amount of the CPM fluid processing medium in a prior Next-ScaleStop fluid processing apparatus using only one column bed unit.

3. The apparatus according to claim 2, wherein a cross-sectional area of each column bed unit in said N column bed units is 1/N of a cross-sectional area of the column bed unit in the prior Next-ScaleStop fluid processing apparatus using only one column bed unit, and a column bed depth of the CPM fluid processing medium in each of the N column bed units is equal to a column bed depth of the medium in the prior Next-ScaleStop fluid processing apparatus using only one column bed unit.

4. The apparatus according to claim 1, wherein, if N−1 check valves are named the $1^{st}, 2^{nd}, \ldots n^{th} \ldots$ and $(N-1)^{th}$ check valves where n is an integer from 1 to N−1, the $n^{th}$ check valve has an opening pressure threshold of a+b*(n−1) psi, and a closing pressure threshold of c+d*(n−1) psi, wherein a is the opening pressure threshold of the $1^{st}$ check valve, b is an increment in the opening pressure threshold, c is the closing pressure threshold of the $1^{st}$ check valve, d is an increment in the closing pressure threshold.

5. The apparatus according to claim 1, wherein said N column bed units, together with said check valves, are further connected in parallel with a bypass flow path, said bypass flow path is provided with a bypass check valve having an opening pressure threshold and a closing pressure threshold respectively higher than the opening pressure thresholds and the closing pressure thresholds of the remaining check valves.

6. A fluid processing apparatus, comprising: a fluid inlet tube, N column bed units, a bypass flow path, and a fluid outlet tube;
   wherein N is a positive integer;
   the column bed units contain a crystallization promoting medium (CPM) as a fluid processing medium for processing fluid flowing therein;
   the N column bed units are connected in parallel with the bypass flow path and are in fluid communication with the fluid inlet tube;
   wherein the bypass flow path is provided with one bypass check valve, the bypass check valve being designed to open and close under a specific fluid pressure; wherein the CPM is a medium having nucleation sites of an atomic size on its surface which promote formation of crystals of a substance, when the substance dissolved in a fluid flows through the CPM, the substance is to form a crystal and grow at the nucleation sites, when the crystal grows to a certain size, the crystal is flushed off by the fluid to release reusable nucleation sites.

7. The apparatus according to claim 6, wherein one master control valve working in an automatic mode is provided upstream of all of the column bed units in a fluid inflow direction, but not upstream of the bypass flow path;
the master control valve opens and closes at predetermined frequency, and each closure of the master control valve lasts long enough for the crystallization promoting medium (CPM) to be completely deposited at a bottom of the column bed units;
when the master control valve is closed, the bypass check valve is opened.

8. The apparatus according to claim 7, wherein a discharge bypass is provided between the master control valve and all of the column bed units, and is in fluid communication with the master control valve and all of the column bed units; and
the discharge bypass is provided with a second control valve working in an automatic mode, said second control valve being configured to open when the master control valve is closed, and to close when the master control valve is opened.

9. The apparatus according to claim 1 or 6, wherein the crystallization promoting medium (CPM) is a template-assisted crystallization (TAC) fluid processing medium, preferably a Next-ScaleStop fluid processing medium.

10. The apparatus according to claim 6, wherein the bypass check valve is a proportional check valve that opens proportionally to the pressure.

11. The apparatus according to claim 6, wherein the bypass check valve is connected in parallel with one or more secondary bypass check valves, and the bypass check valve and the secondary bypass check valve(s) in parallel connection have different opening pressure thresholds and different closing pressure thresholds from one another.

12. The apparatus according to claim 6, further comprising a crystal growth medium (CGM) that is a medium that provides a surface for temporarily adsorbing "crystal seeds" produced by the CPM, and has one or more of the following characteristics: 1) having an attractive charge, 2) having a rough surface with a plurality of micropores for adsorbing the "crystal seeds", 3) having a chemical attraction force, and 4) having a physical attraction force;
the crystal growth medium and the crystallization promoting medium are mixed together and contained in the column bed units, or the crystal growth medium is separately connected downstream of a column bed unit of the crystallization promoting medium.

13. The apparatus according to claim 12, wherein said crystal growth medium is granular activated carbon (GAC) or Next-Sand.

14. The apparatus of claim 6, wherein except a first of the column bed units, each column bed unit is provided with one bed check valve upstream thereof in a fluid inflow direction;
the N column bed units together with the bed check valve(s) are connected in parallel with the bypass flow path and are in fluid communication with the fluid inlet tube; and
wherein the bypass check valve has an opening pressure threshold and a closing pressure threshold respectively higher than the opening pressure threshold(s) and the closing pressure threshold(s) of the bed check valve(s).

15. The apparatus of claim 14, wherein one or more of the bed check valves is a proportional check valve that opens proportionally to the pressure.

16. The apparatus of claim 14, wherein one or more of the bed check valves is connected in parallel with one or more secondary bed check valves, and the bed check valves and the secondary bed check valve(s) in parallel connection have different opening pressure thresholds and different closing pressure thresholds from one another.

\* \* \* \* \*